Feb. 3, 1970 R. E. FERN ET AL 3,493,891

AVALANCHE BREAKDOWN SEMICONDUCTOR LASER

Filed Aug. 2, 1965

INVENTORS
ROBERT E. FERN
KURT WEISER

BY

ATTORNEY

United States Patent Office 3,493,891
Patented Feb. 3, 1970

3,493,891
AVALANCHE BREAKDOWN SEMICONDUCTOR LASER
Robert E. Fern, Yonkers, and Kurt Weiser, Millwood, N.Y., assignors to International Business Machines Corporation, Armonk, N.Y., a corporation of New York
Filed Aug. 2, 1965, Ser. No. 476,271
Int. Cl. H01s 3/18
U.S. Cl. 331—94.5                                       2 Claims

ABSTRACT OF THE DISCLOSURE

Lasing has been observed in p-type GaAs in which the necessary population inversion is achieved through avalanche breakdown of a high-resistivity region in the material. Such a region is created when zinc, an acceptor, is diffused into manganese doped p-type GaAs. Previously, the population inversion necessary for laser action had been brought about in semiconductors either by injection of minority carriers through a forward biased p-n junction, creation of electron-hole pairs in a bulk semiconductor by electron bombardment, or by creating such pairs by intense external illumination.

---

This invention relates to lasing structures and more particularly to a single conductivity type semiconductor material for use as a lasing material.

Semiconductor lasers, or solid state lasers as they are sometimes called, have been described in the literature since the early 1960's. In such semiconductor lasers, the more popular device was called a p-n junction injection laser. Such injection laser requires for its operation a body in which an n-region adjoints a p-region of the same material so that when current is passed in the forward-biased direction of the combined p-n device, lasing takes place at the junction of the p-type and n-type regions. Prior publications and patents also treat of obtaining lasing action in a bulk semiconductor either by electron bombardment of such bulk semiconductor or by intense external illumination of such bulk semiconductor. In the latter two examples, the external energy, namely, either the electron bombardment or the intense light, creates electron-hole pairs in the semiconductor and radiation takes place upon recombination of such electrons and holes.

The present device to be described herein wishes to avoid the need to employ a p-n junction in constructing a laser or an electroluminescent device by employing only a single conductivity type material, but still provide the excitation necessary for lasing by passing current through the device. Thus lasing is to be accomplished by employing either an all p-type structure or an all n-type structure. As will be described hereinafter, the use of a single conductivity type semiconductor permits lasing whether the current applied to the device enters the latter on one side or the other. Moreover, the novel device that employs only a single type conductivity material permits the laser to operate by pulses of alternate polarity. Additionally, by relying upon a single conductivity type material, the range of materials that can be used as a semiconductor laser is increased. For example, by making compounds from elements of the II-B Group and VI-A Group of the Periodic Table of the Elements, semiconductors can be prepared which would be desirable for use as lasing materials. The band gaps of the materials in these groups are such that they will emit in the visible range when recombination of electrons and holes takes place. However, most of these compounds, such as CdS or ZnTe, cannot be fabricated into p-n junction diodes, since they exist only in n- or p-type form. However, even though such compounds can only be manufactured so as to be of a single type conductivity material, they can be employed as lasing material in the manner to be taught by this invention. Thus the present invention will provide means for extending the range of materials that can be employed as semiconductor lasers.

Thus it is an object of this invention to make a lasing or electroluminescent structure that is composed of a single conductivity type material.

It is a further object to make a lasing or electroluminescent structure of a single conductivity type semiconductor structure where the conductivity is p-type.

It is yet another object to provide a lasing or electroluminescent structure of a single conductivity type semiconductor structure where the conductivity is n-type.

It is yet another object of this invention to provide a lasing structure that will permit a wider range of materials to be used as lasing materials.

The foregoing and other objects, features and advantages of the invention will be apparent from the following more particular description of preferred embodiments of the invention, as illustrated in the accompanying drawings.

Figure 1:
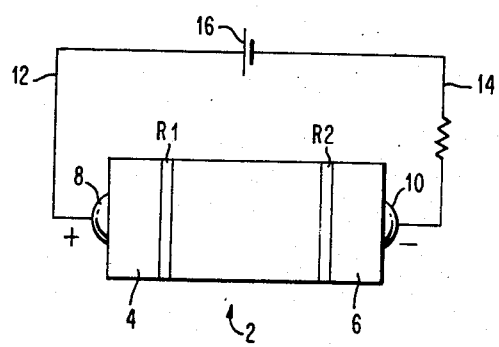
FIGURE 1 is a schematic showing of an embodiment of the invention wherein the single conductivity type lasing structure is of a single conductivity type material.

The structure shown in cross-section in FIGURE 1 comprises a GaAs crystal 2 that has been doped with Mn. Both sides of the crystal are diffused with Zn and two such Zn layers 4 and 6 are shown. Suitable contacts 8 and 10 are provided for the device so that leads 12 and 14 can be connected from said contacts to a suitable source of power, such as battery 16.

Figure 2:
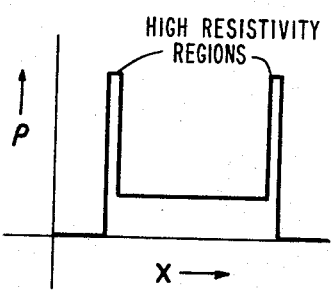
FIGURE 2 is a resistivity profile of the structure of FIGURE 1.

FIGURE 2 is relied upon as an aid in understanding the operation of the structure shown in FIGURE 1. FIGURE 2 is a schematic plot of the resistivity as a function of distance X through the structure. It is seen that at boundaries of layers 4 and 6, thin high resistivity regions R1 and R2 exist. The width of these regions is of the order of microns; it is understood that the diagram shows only relative but not absolute values of the resistivities of these regions. When a voltage V is applied to the structure through contacts 8 and 10 from battery 16, the electric field will be highest in the high resistivity regions R1 and R2. As the voltage is increased, the field at each of the regions R1 and R2 increases until an avalanche breakdown occurs. During such avalanche breakdown electrons are created in one or both of the high resistivity regions R1 and R2. The electrons thus created are swept toward the positive terminal 8 and recombine radiatively in the Zn layer 4. Some radiative recombination also takes place during such electron transit with the Mn impurity centers, but such recombination is a minor contribution towards the main radiation produced when light emission occurs. By reversing the polarity of the applied voltage, the above described light emission now takes place in the other Zn region 6. The avalanche breakdown noted above is a non-destructive process so that the process can be cycled.

Figure 3:
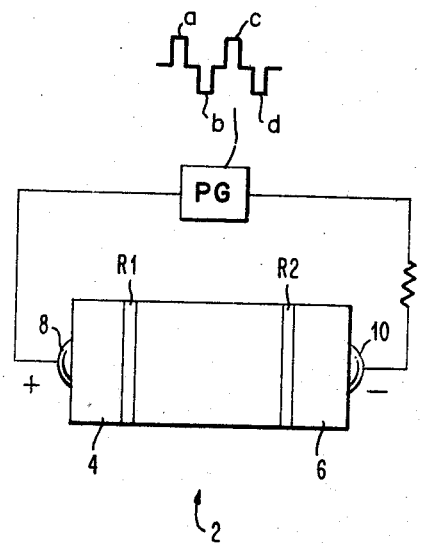
FIGURE 3 illustrates the invention being operated with alternating pulses of opposite polarities.

FIGURE 3 illustrates how the laser or electroluminescent device can be operated by applying alternating pulses of opposite polarities to the terminals 8 and 10 of the novel structure. A pulse generator PG, or the like, can be made to produce pulses of opposite polarities as indicated by the pulses a, b, c and d. When the invention is practiced in the manner depicted in FIGURE 3, light emission takes place alternatively to the left of resistive region R1 and to the right of resistive region R2.

The invention also envisions the employment of a single p-type structure wherein the region between R1 and R2 is made sufficiently narrow so that the high resistivity regions R1 and R2 merge. In such case, the light emission takes places with only one highly resistive region in an all p-type material. Thus the practice of the invention is not limited to a pair of resistive regions within the body of the semiconductor material.

In the manufacture of the p-type structure shown in FIGURE 1, a 4 mil thick slice of Mn doped GaAs is placed in an ampule, together with some zinc arsenide. The ampule is evacuated, sealed off, and placed in a furnace. Diffusion of Zn into the Mn doped GaAs is allowed to proceed for about 3 hours at 850° C. To provide the ohmic contacts 8 and 10, indium, or a similar metal, is alloyed into the Zn diffused surfaces; other techniques may be employed for making ohmic contacts, i.e., plating. A representative structure would have the central region between R1 and R2 2 mils wide and the diffusion layers 4 and 6 are about 1 mil each in width.

Figure 4:
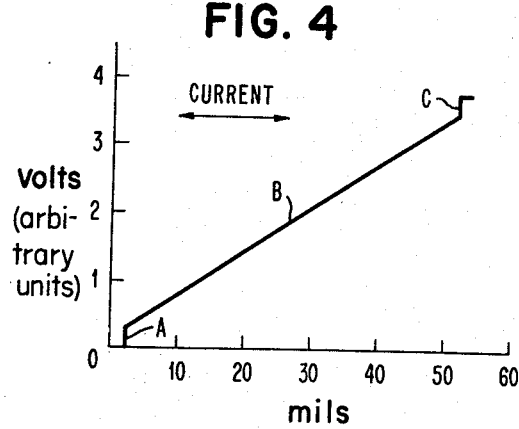
FIGURE 4 is a voltage-distance plot through the structure of FIGURE 1 when current is passed through it.

FIGURE 4 is relied upon to prove that the structure manufactured as described above is an all p-type structure. The voltage profile of FIGURE 4 through the light device of FIGURE 1 was established when a current was sent through an all p-type structure. The sharp voltage drops at A and C of FIGURE 4 indicating high resistivity regions in the p-type material and such high resistivity regions correspond to regions R1 and R2 at the boundary of the Zn diffused layers. The voltage drop across the region between R1 and R2 is the expected drop due to the resistivity of the starting material (before Zn diffusion) so that the properties of this region are not affected by the Zn diffusion. By etching the device of FIGURE 1, so as to delineate the Zn diffused layers, a definite correspondence was observed between the location of the high resistivity regions and the boundaries of the Zn diffused regions.

Moreover, the current voltage characteristics shown in FIGURE 4, when taken over a range of currents, were such as to preclude the presence of a p-n junction in the structure of FIGURE 1. Tests indicated that the current-voltage relationship across the high resistivity regions are ohmic over a large enough voltage range so as to indicate that these regions could only be high resistivity regions in a p-type semiconductor. Since the Zn regions such as 4 and 6 are low resistivity p-type and since Mn doped GaAs is also p-type, the completed unitary device of FIGURE 1 is an all p-type material.

It should be noted at this point that it is not critical how one manufactures the p-type, for example, Mn doped GaAs, structure of FIGURE 1 so long as the surface dopant, such as Zn, creates, when incorporated into the Mn doped GaAs, highly resistive regions within the body of the p-type crystal. In some cases, diffusion of the surface dopant will be desirable; in other cases, epitaxial growth of the surface layer will be the preferred method or step in the manufacturing process. The invention is not to be limited by the mode of manufacturing the p-type device.

The structure exemplified by FIGURE 1, with the resistivity profile shown in FIGURE 2, can also be made using dopants other than zinc and manganese in GaAs. Not only can two different p-type dopants, other than Zn and Mn be used, but two different n-type dopants might be used to provide an equivalent all n-type structure. Furthermore, similar structures (all n-, or all p-type) might be made in semiconductor materials other than GaAs.

The device of FIGURE 1 emits light when current is passed therethrough as a result of the avalanche breakdown discussed hereinabove. Such light is normally referred to as electroluminescent, resulting from the recombination phenomenon also discussed hereinabove. If the device of FIGURE 1 is provided with parallel surfaces, above and below the plane of the paper, that are highly polished so as to reflect light back into the electroluminescing structure, such feedback of light will result in lasing. In effect, the present invention is an electroluminescent device which, when employed in a suitable optical cavity, can be employed as a laser. The generic term "light-emitter" relates to the electroluminescent or lasing characteristics of the invention.

Figure 5:
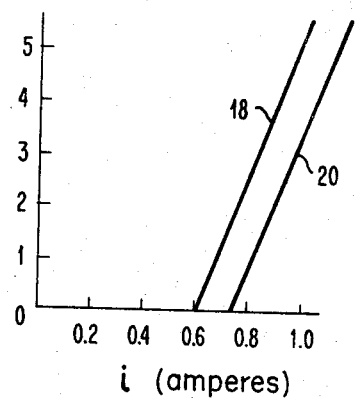
FIGURE 5 is a plot of light intensity produced by the structure of FIGURE 1 versus current through it.

FIGURE 5 is a curve indicating the light intensity I, represented in arbitrary units, vs. current $i$ in amperes. When the device of FIGURE 1 was operated close to 4.2° K., curve 18 was the plot of light intensity vs. current when current was sent in one direction through the structure. Curve 20 represents the plot when current was sent in the opposite direction through the structure. The change in polarity results in a slight difference in threshold current, one threshold being approximately 0.6 ampere and the other about 0.75 ampere. Thus a device has been created which permits light emission irrespective of the polarity of the current. When currents higher than threshold currents were applied to the device of FIGURE 1, the lasing mode structure was observed in the spectral distribution of the emitted light.

In its broadest aspect, the invention described herein creates a thin high resistivity region in a single conductivity type semiconductor structure so that when current is applied across said single type semiconductor, avalanching occurs in said high resistivity region so as to obtain carriers of the opposite type which, upon recombining with the majority carriers of the selected semiconductor structure, will give off light. Thus, if the combined structure of FIGURE 1 has high resistivity regions R1 and R2 and is of n-type material only, then holes will be created by current from source 16, source PG (FIGURE 4), or other voltage sources. Such holes, upon recombining with the majority carriers (in this case electrons) produces light. Alternatively, when the combined structure of FIGURE 1 is composed only of a p-type material, current applied across said p-type material will create avalanching in the high resistivity regions so as to obtain electrons which, upon recombining with the majority carriers (in this case holes), will emit light.

The above described invention is believed to be the first discovery that a single type conductivity material can be employed as a lasing semiconductor, using a flow of current through the semiconductor rather than relying upon external energy to activate the semiconductor. Such discovery increases the diversity with which lasing materials can be operated and also increases the range of materials that can be employed as semiconductor lasing devices.

While the invention has been particularly shown and described with reference to preferred embodiments thereof, it will be understood by those skilled in the art that the foregoing and other changes in form and details may be made therein without departing from the spirit and scope of the invention.

What is claimed is:
1. A light-emitting device comprising:
a manganese doped GaAs crystal,
layers of zinc diffused on opposing faces of said crystal, whereby very highly resistive regions are created within said crystal at the boundaries of the zinc diffused layers, and
means for applying current in a forward direction of sufficient intensity to produce avalanching, and for sweeping minority carriers toward said zinc diffused layers, said minority carriers recombining with majority carriers in said zinc diffused layers,
said recombination causing light emission in a direction normal to the direction in which said minority carriers are swept.

2. The light-emitting device of claim 1, wherein the crystal is within a resonant cavity, said resonant cavity being arranged perpendicularly to the direction of flow of said minority carriers therein, whereby the light emission from said crystal is stimulated emission.

References Cited

UNITED STATES PATENTS

| | | | |
|---|---|---|---|
| 3,309,553 | 3/1967 | Kroemer | 331—94.5 X |
| 3,412,344 | 11/1968 | Pankove | 331—94.5 |
| 3,258,718 | 6/1966 | Zeiger et al. | 331—94.5 |

OTHER REFERENCES

Melngailis et al.: "Luminescence and Coherent Emission in a Large Volume Injection Plasma in InSb", Applied Physics LeHers, vol. 5, pp. 99–100, Sept. 1, 1964.

JEWELL H. PEDERSEN, Primary Examiner

E. BAUER, Assistant Examiner

U.S. Cl. X.R.

313—108; 317—235